Sept. 10, 1968          B. J. CARR          3,401,264

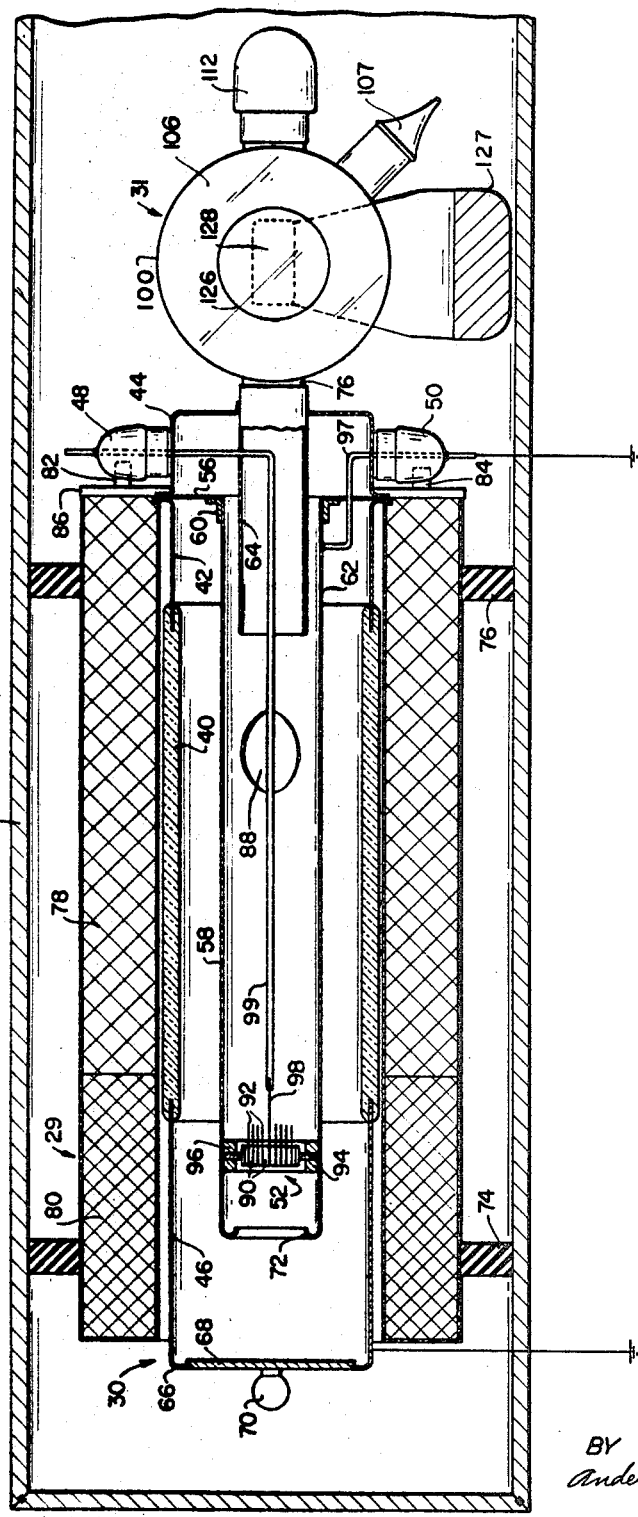

PULSED NEUTRON GENERATOR WITH VARIABLE POTENTIAL CONTROL GRID

Original Filed June 4, 1963          10 Sheets-Sheet 2

INVENTOR
BARNEY J. CARR

BY Anderson, Spangler & Wymore
ATTORNEYS

Sept. 10, 1968  B. J. CARR  3,401,264
PULSED NEUTRON GENERATOR WITH VARIABLE POTENTIAL CONTROL GRID
Original Filed June 4, 1963  10 Sheets-Sheet 3

INVENTOR
BARNEY J. CARR

BY *Anderson, Spangler & Wymore*
ATTORNEYS

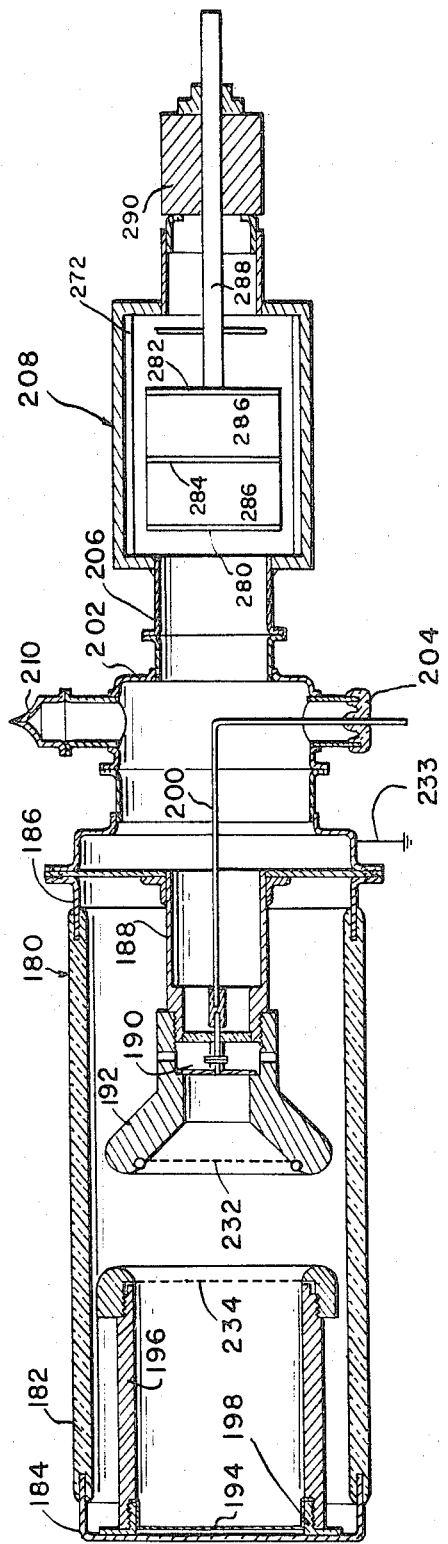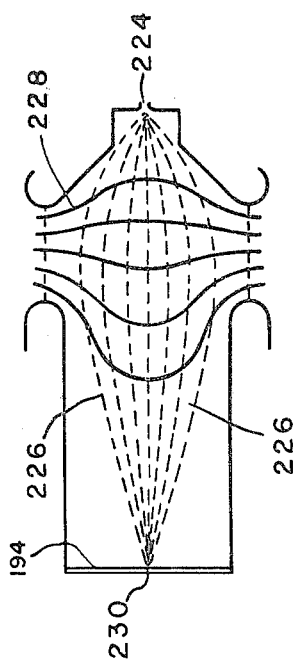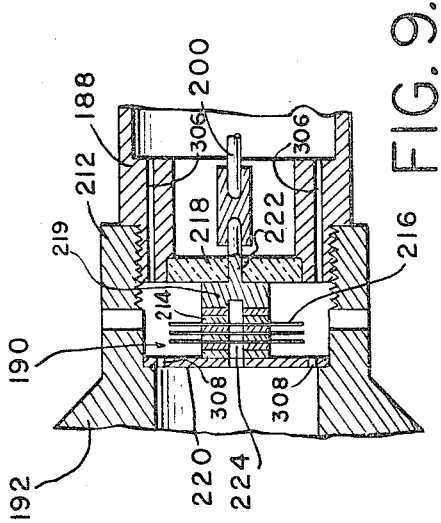

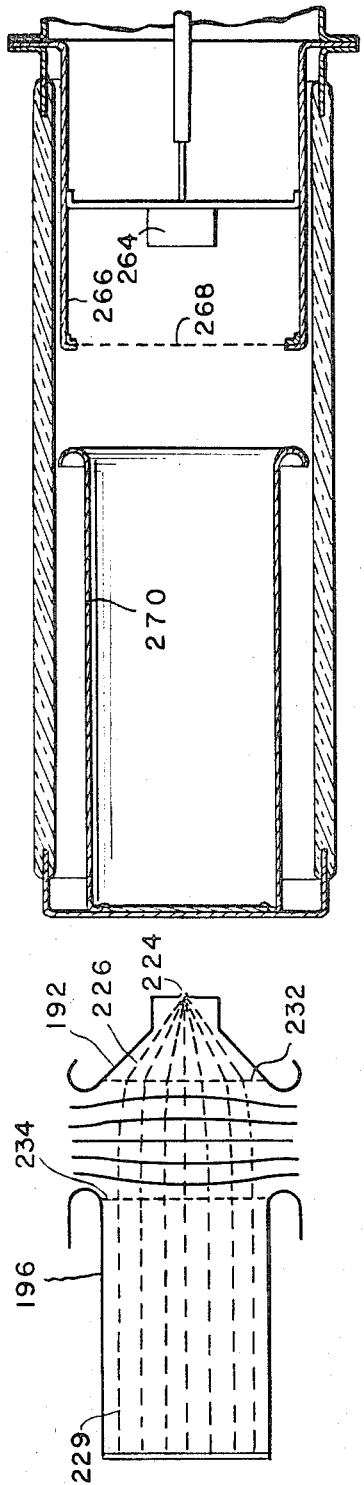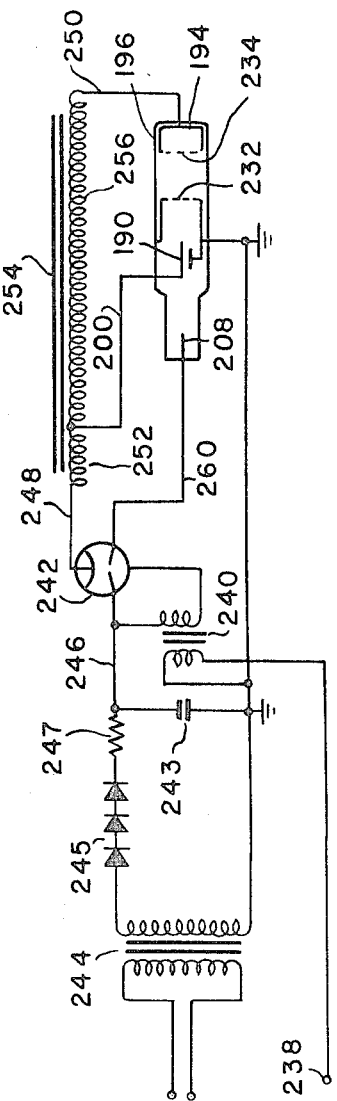

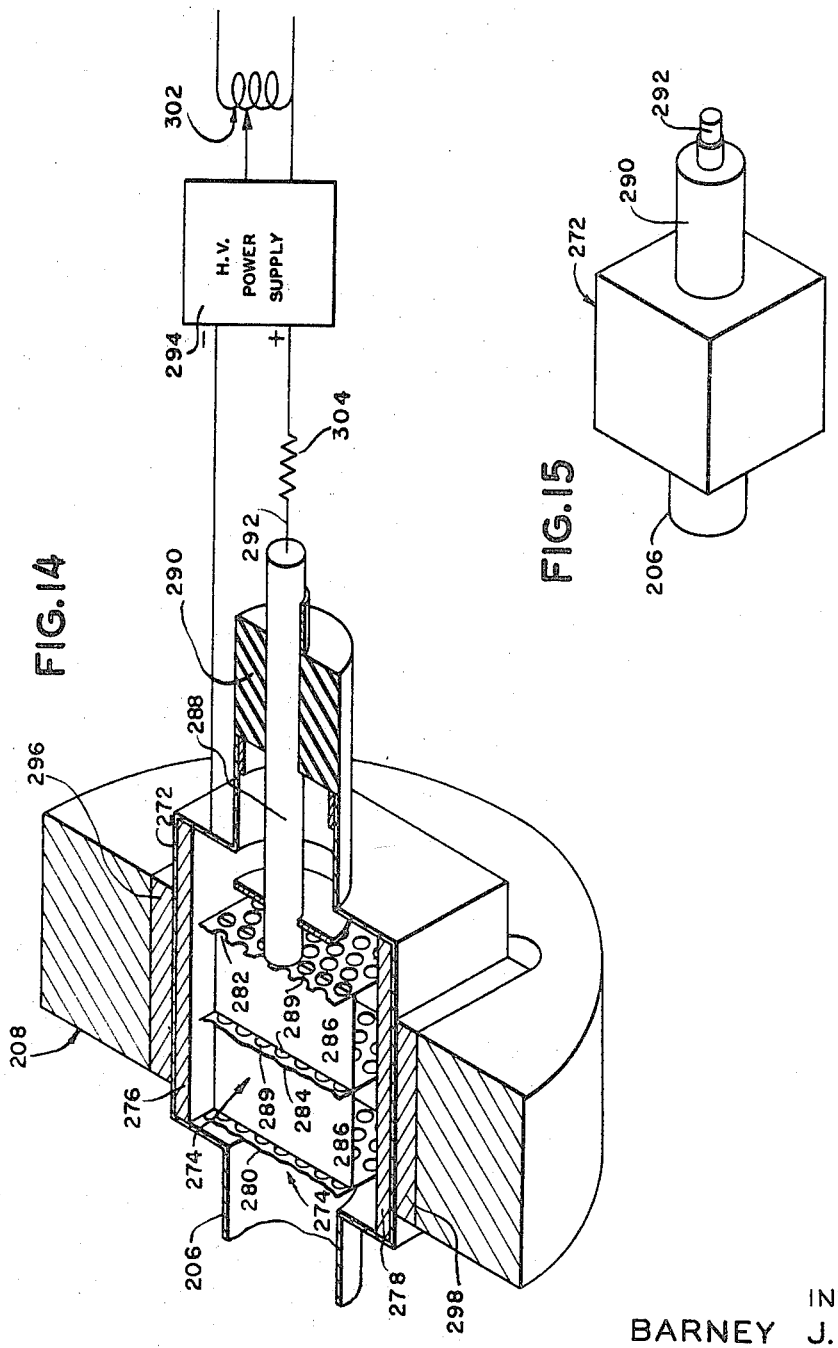

Sept. 10, 1968  B. J. CARR  3,401,264
PULSED NEUTRON GENERATOR WITH VARIABLE POTENTIAL CONTROL GRID
Original Filed June 4, 1963  10 Sheets-Sheet 7

INVENTOR
BARNEY J. CARR
BY
*Anderson, Spangler & Wymore*
ATTORNEYS

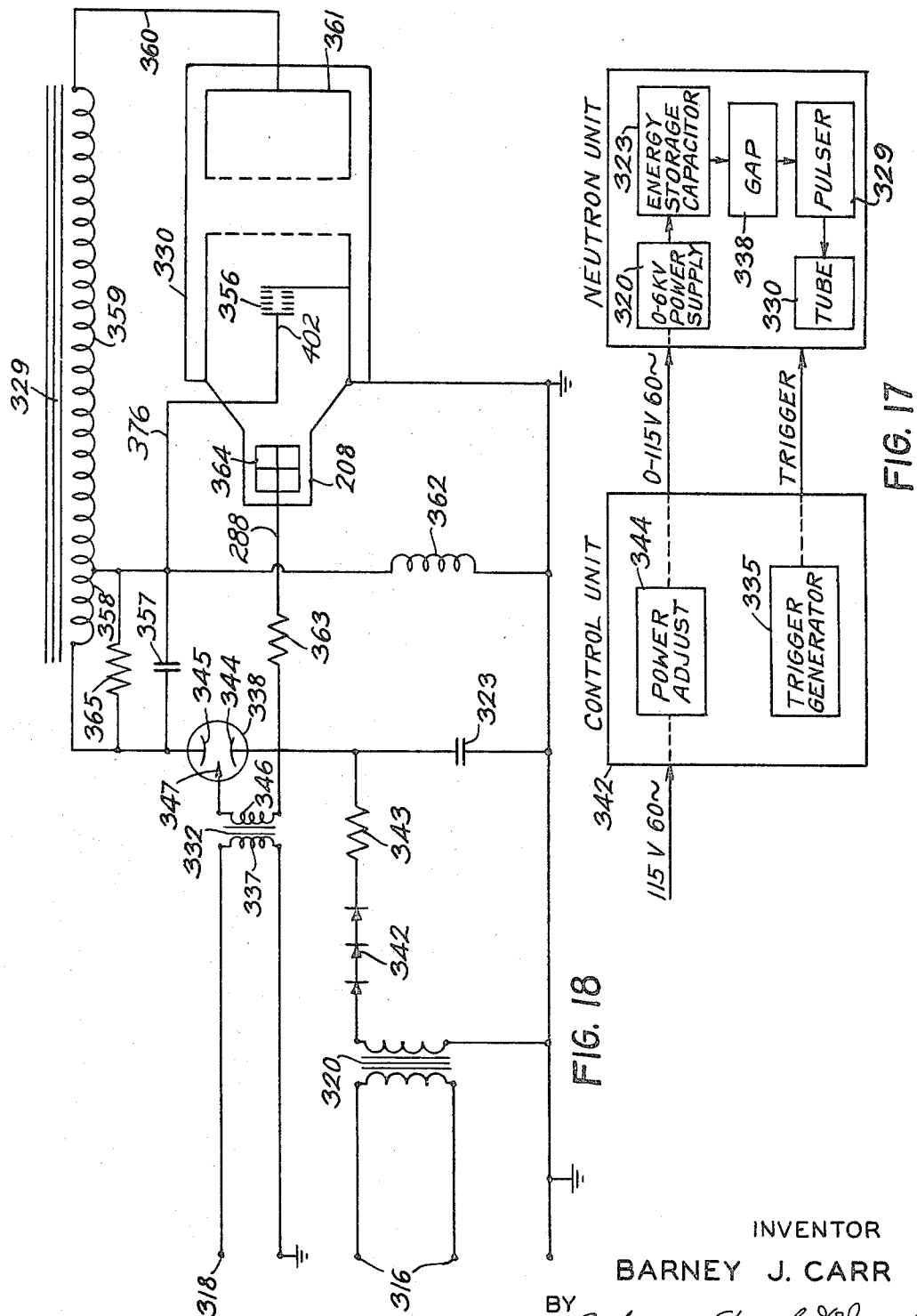

Sept. 10, 1968  B. J. CARR  3,401,264
PULSED NEUTRON GENERATOR WITH VARIABLE POTENTIAL CONTROL GRID
Original Filed June 4, 1963  10 Sheets-Sheet 9

INVENTOR
BARNEY J. CARR
BY Anderson, Spangler & Wymore
ATTORNEYS

Sept. 10, 1968  B. J. CARR  3,401,264
PULSED NEUTRON GENERATOR WITH VARIABLE POTENTIAL CONTROL GRID
Original Filed June 4, 1963  10 Sheets-Sheet 10

INVENTOR.
BARNEY J. CARR
BY
Anderson, Spangler & Wymore
ATTORNEYS

United States Patent Office 3,401,264
Patented Sept. 10, 1968

3,401,264
PULSED NEUTRON GENERATOR WITH VARIABLE POTENTIAL CONTROL GRID
Barney J. Carr, Colorado Springs, Colo.; Elisabeth H. Carr, special administratrix of said Barney J. Carr, deceased, assignor to Kaman Corporation, a corporation of Connecticut
Continuation of application Ser. No. 285,305, June 4, 1963. This application Mar. 25, 1966, Ser. No. 537,574
The portion of the term of the patent subsequent to July 21, 1981, has been disclaimed
9 Claims. (Cl. 250—84.5)

ABSTRACT OF THE DISCLOSURE

Neutron generator comprising an ion source, a target spaced therefrom including a substance adapted to produce neutrons on impingement of ions thereon, a control grid electrically isolated from and selectively maintained at a potential other than that of the ion source disposed intermediate the ion source and the target, all disposed within a container maintained under a high degree of vacuum.

---

This invention relates to neutron generators and particularly to rapidly pulsed readily portable neutron generators utilizing low energy acceleration of positive ions and a target of material arranged to be bombarded by the ion beam particles. This application is a continuation of my application Ser. No. 285,305, filed June 4, 1963, now abandoned, which is a continuation-in-part of my application Ser. No. 1,979 filed Jan. 12, 1960, for "Pulsed Neutron Generator," now U.S. Patent No. 3,141,975.

In carrying out of various experimental and test procedures in the field of nuclear physics, it is necessary to subject various materials to neutron radiation. This requires a neutron source. Since many of the procedures require rapid repetition of an intense short pulse of neutrons, it is highly desirable to have a neutron source which will operate in this manner. The neutron sources heretofore available were either much too large and immobile to be usable for certain areas of work (oil well logging, nuclear reactor research, activation analysis, etc.) or were incapable of rapid repetition of a high intensity pulse.

The present invention is concerned with overcoming these difficulties and has for a primary object an improved portable neutron source or neutron generator which will operate at high neutron output (approximately $10^7$ neutrons per pulse) with pulse length lasting several microseconds and pulse rates greater than 10 pulses per second.

As will hereinafter appear, this object of the invention is accomplished by novel improvements to the ion pump, the ion sources, the pulse transformer, the arrangement of accelerator tube components, and certain novel circuit improvements.

An important object of the invention is to provide an improved positive ion accelerator tube of the pulsed type which is particularly adapted for use as a component of a portable source to insure a high rate neutron emission per pulse and a high rate of pulsing.

Another object is to provide improvements in ion optics in accelerator tubes for neutron generators.

A further object is to provide improvements in both the components, component arrangement and circuitry of a pulsed neutron generator adapted to either well logging or laboratory use.

Other objects are to improve and simplify the construction of a highly compact neutron generator in a manner to permit fabrication at relatively low manufacturing cost, the improved unit being of rugged construction and operable over a long service life with a minimum of maintenance.

Other objects and advantages will become apparent to persons skilled in the art, as will various modifications thereof without departure from the inventive principles as defined in the appended claims.

The drawings show three embodiments of the invention and such embodiments will be described, but it will be understood that various changes may be made from the constructions disclosed, and that drawings and description are not to be construed as defining or limiting the scope of the invention, the claims forming a part of this specification being relied upon for that purpose.

FIGURES 1 to 7 show a neutron generating unit constructed in accordance with the invention, FIGURE 1 being a fragmentary longitudinal sectional view.

FIGURE 2 is an enlarged fragmentary view showing in longitudinal section the improved ion source included in the neutron generating unit shown in FIGURE 1.

FIGURE 3 is a fragmentary front elevational view of the ion source as shown in FIGURES 1 and 2.

FIGURE 4 is a broken view, largely in longitudinal section, of a complete neutron generator including the neutron generating unit and associated elements as designed especially for oil well logging use in accordance with the invention.

FIGURE 5 is a perspective view showing the construction of the ion pump and gage shown in FIGURES 1 and 4.

FIGURE 6 is a circuit diagram for the device shown in FIGURE 4.

FIGURE 7 is a block diagram illustrating the major components of the neutron generator and also illustrates the connection to a control unit remote therefrom.

FIGURE 8 illustrates in longitudinal section portions of an alternative neutron generator embodying the invention.

FIGURE 9 illustrates, in enlarged section, the details of the ion source of the device of FIGURE 8.

FIGURE 10 is an electric field plot illustrating ion trajectories established in the device of FIGURE 8 when operated without a source grid.

FIGURE 11 is an electric field plot showing grid controlled ion trajectories in the device of FIGURE 8.

FIGURE 12 is a diagram of a preferred circuit for the positive ion accelerators of FIGURES 8 and 12.

FIGURE 13 illustrates a fragmentary longitudinal section of an accelerator tube embodying field shaping by use of a single grid and modified with respect to the tube in FIGURE 8.

FIGURE 14 is an enlarged fragmentary longitudinal sectional view of an ion pump incorporating an alternate embodiment of the ion pump shown in FIGURES 1, 4 and 5.

FIGURE 15 is a perspective of a portion of the ion pump shown in FIGURE 14.

FIGURE 17 is a circuit diagram for the device as shown in FIGURES 16A and 16B.

FIGURE 18 is a block diagram generally similar to FIGURE 7, but illustrating the neutron generator as shown in FIGURES 16A, 16B and 17.

While it is known how to produce fast neutrons, for example 14.3 mev., by a $T(d, n)He^3$ reaction in short pulses (for example a few microseconds in length) devices productive of that result have heretofore been either quite bulky and not adapted for portable use or have not permitted rapid repetitive pulsing which is necessary in certain types of use and experimentation. Both portability and the capability of producing rapid high intensity pulses of neutrons are necessary for certain test and research work as, for example, some oil well logging, some nuclear reactor tests, and some laboratory nuclear research.

Alternative neutron generators are herein illustrated and described and each of them operates effectively over long periods of use to produce approximately $10^7$ neutrons per pulse with a pulse length of approximately 4 microseconds and permits a pulse rate of greater than 10 pulses per second. The principles taught herein are of course not limited to a generator of neutrons at one particular energy level and with suitable modifications the illustrated generators will operate in an equally dependable manner to produce neutrons at other energy levels. For example, while each apparatus herein described involves a T-D reaction, it is apparent that with certain modifications of the ion source, target, and voltages employed, either a D-T, or a D-D, reaction could be obtained, the characteristics of which are known in the art.

*Neutron generator as shown in FIGS. 1 to 7*

Figure 4:
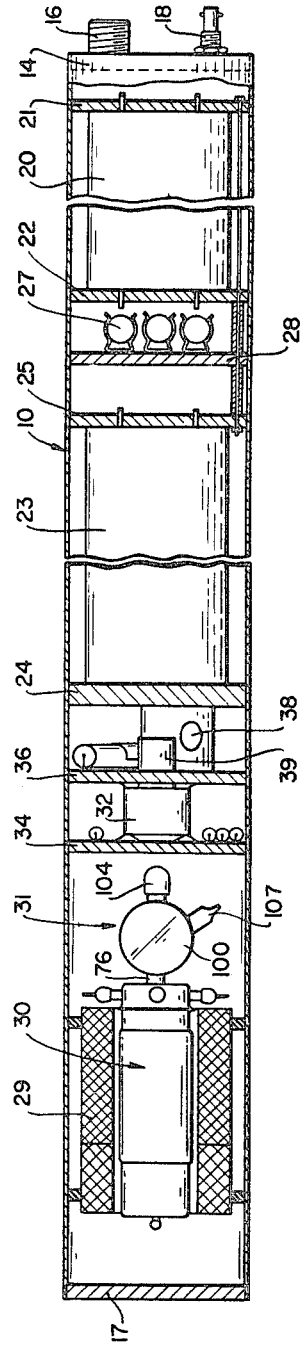

FIGURES 1 and 4 show one form of a compact neutron generator incorporating the principles of the invention, the generator including all of the components required for operation when connected to a remote unit from which it receives alternating current at line voltages and from which it receives actuating pulses.

The generator is housed in an elongated metal cylinder 10. When the generator is primarily adapted for well logging or the like, the cylinder 10 may be between three and four feet in length and of a diameter such as about four inches, so as to permit the unit to be lowered into the bore of an oil well or the like. One end of the cylinder 10, the upper end during use, is capped by a metal disc 14, O-ring sealed thereto, through which electric fixtures 17 and 18 extend for connection to both an A.C. power source and to a remote source of pulsed actuating signals. The opposite or lower end of the cylinder 10 is closed by a welded disc 17. The housing thus formed is hermetically sealed and it is preferably filled with oil or gas to protect the generator components from voltage breakdown.

Figure 6:
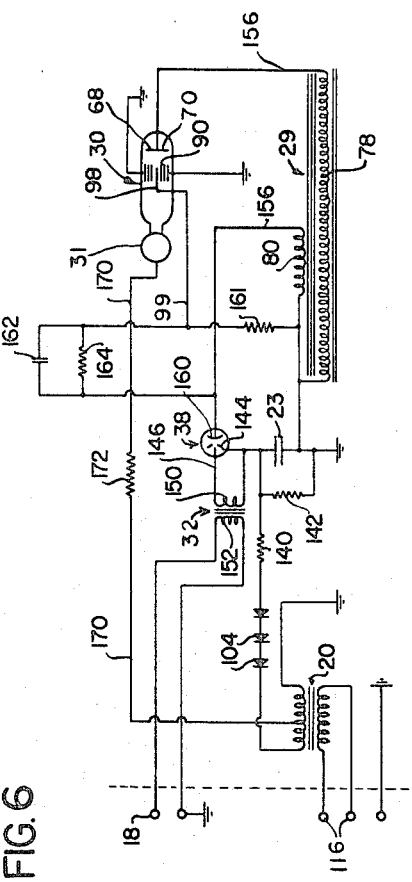

Basically, the components within housing 10, as shown in FIGURE 4, include an A.C. power transformer 20, mounted between partitions 21 and 22 of electrically insulating material, a condenser 23 of large capacity mounted between partitions 24 and 25, three diodes 27 in fixtures supported by a partition 28, a target pulse transformer 29, and a positive ion accelerator neutron source tube 30 having an associated ion pump 31, a small pulse transformer 32 mounted between partitions 34 and 36, and a trigatron tube 38 and other small components 39 between partitions 24 and 36 and on partition 34 to complete the assembly, the wiring diagram of which is shown in FIGURE 6.

When the neutron generator is primarily adapted for laboratory use, the power supply parts can be separated from the neutron accelerator tube assembly, in which case this latter assembly may be encased in a cylinder similar to the cylinder 10 but much shorter.

The neutron generator unit, as shown in FIGURE 1, includes the before-mentioned positive ion accelerator neutron source tube 30. The tube is vacuum sealed and is continuously pumped by its associated ion pump 31. Said tube 30 is an assembly housed in a glass and metal cylinder comprising a cylindrical glass insulator 40, the ends of which have bonded thereto, by glass to metal seals, upper and lower metal sleeves 42 and 46 which constitute sleeve extensions. A metal cap 44 provides an end closure for the upper sleeve 42, the cap 44 being peripherally apertured to receive insulators 48 and 50. The cap 44 has an inner flanged margin, as does the outer end of the sleeve 42, and a centrally apertured disc 50 has its margin disposed between the flanges, said flanges and the disc being welded in a unitary assembly so as to complete the end closure and so as to properly position the disc 56. A metallic inner cylinder 58 is centrally positioned within the accelerator tube 30, said cylinder extending through the central aperture in the disc 56 and being supported on said disc by means of an annular bracket 60 welded to said disc and said cylinder. The before-mentioned ion source 52 is positioned within and near the opposite end of the cylinder 58.

A portion of a centrally positioned cylindrical conduit 64 extends through a central aperture in the end wall of the cap 44 to which it is welded. The upper portion of the conduit 64 has a smaller diameter as indicated at 76, this last said portion having a sealed connection with the ion pump 31. The lower end of the lower sleeve 45 terminates in an annular flange 66 for the marginal support of a disc target 68 to complete the glass and metal cylindrical enclosure which is sealed to the atmosphere. The target 68 has fixed to the lower face thereof a high voltage connector 70 of the ball type, the conductor leading therefrom and other connections being omitted from FIGURE 1 inasmuch as they are clearly shown in the wiring diagram of FIGURE 6. The lower or free end of cylinder 58 is provided with a polished inwardly rolled margin 72 defining an aperture through which ions are drawn by the target 68 from the source 52 as explained in detail below. The wall of the cylinder 58 is ported as at 88 to facilitate gas flow between the interior of the glass and metal cylinder 30 and the ion pump 31 through the said conduit 64.

The above-described glass and metal enclosure or source tube 30 is received in the bore of the before-mentioned cylindrical target pulse transformer 29. The pulse transformer is supported within the housing 10 by suitable annular insulators 74 and 76 spaced axially as shown. The transformer 29 is of the auto type with the windings encased in a cylindrical housing of epoxy resin cast under high pressure, for example at 3500 p.s.i., to obtain a rugged structure of high dielectric characteristics. The transformer 29 comprises an upper secondary winding 78 and a lower primary winding 80. The lower end of the primary winding is above the level of the target 68 and the upper end of said primary winding is above the level of the ion source 52. The length of the secondary winding 78 is shown as being a little more than twice that of the primary winding 80. Three winding leads are brought out at the upper end of the secondary section 78 through an insulating tube clamp bracket 86, two of the three leads being shown at 82 and 84.

The ion source 52 produces a high density space charge neutralized deuterium ion cloud or plasma when an interleaved stack of titanium discs or washers having deuterium gas occluded therein are peripherally arced by electrical pulses sufficiently to drive out the occluded deuterium. While it is broadly known how to produce a plasma by arcing a stack of gas occluded discs, the present structure involves a novel and particularly effective disposition of the involved elements with confinement of the resulting plasma to a relatively small area externally of the stack from where it may rapidly be accelerated to target 68, which is of tritium loaded titanium, for the production of neutrons at a high output rate.

Figure 3:
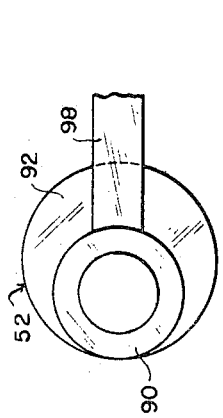
Figure 2:
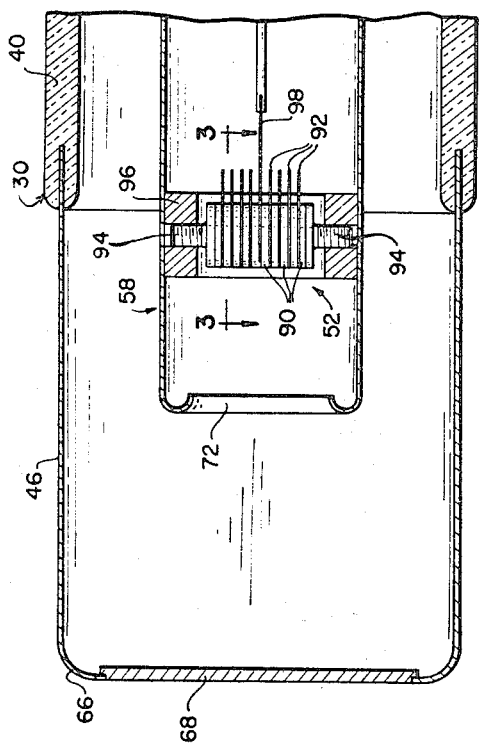

As best shown in FIGURES 2 and 3, source 52 includes a stack of titanium discs 90 in which deuterium has been occluded by the known process of outgasing the titanium discs under heat to permit the metal to absorb large quantities of the gas. While titanium is preferred for this purpose, other transition metals such as tantalum, zirconium, or the like may be used; however, titanium will absorb larger amounts of the hydrogen isotopes than the others, hence it is used both in the ion source discs 90 and in target 68 in which deuterium or tritium is occluded. Discs 90 are maintained clamped between mica insulating discs 92, and as shown in FIGURE 2, the stack is held radially within cylinder 58 between a pair of flat-headed stud bolts 94 which are diametrically disposed in screw-threaded relation to a metal ring 96 welded to cylinder 58. While the drawings show only four discs 90, a larger number may be used in actual practice for increased efficiency.

Mica discs 92 and titanium discs 90 are peripherally aligned at the lower or left side of the stack as shown in FIGURES 2 and 3, with the positions of the edges of the mica discs progressively increasing radially to prevent arcing in all but the lower or frontal area of the discs. A strip of metal 98 of high melting point and good electrical conductivity is clamped between the two centrally disposed discs 90 to provide a pulse lead, the strip 98 being in direct contact with these discs. The lead 98 is electrically connected with a conductor 99 extending through the before-mentioned insulator 48 on the cap 44. The cylinder 58 is grounded by a conductor 97 welded thereto and brought out through the before-mentioned insulator 50 on the cap 44. It will be apparent that the opposite ends of the ion source stack are grounded through the ring 96 and the studs 94 and that the opposite portions of the stack are connected in series between each side of pulse lead 98 and the ground for interarcing of the discs 90 in response to applied pulses.

The ion source 52 above described has been found particularly effective even when produced on a very small scale. For example, the discs 90 need not be larger than 1/16" in diameter or more than .010" in thickness. Mica discs 92 need not be more than fifty percent larger in diameter than discs 90 and not more than .002" in thickness. The arc area is confined to a small portion of the diameter of the discs and a highly localized plasma producing surface is involved.

As will be readily understood, the production of a plasma as above requires a surrounding vacuum, and since the arc expelled gases contaminate that vacuum, the glass and metal envelope or source tube 30 which encloses the ion source 32 must be pumped to maintain the desired degree of vacuum. The function of the ion pump 31 is continuously to draw off the neutral gas which does not enter into the neutron producing reaction through target bombardment. The pump 31 is connected with the inner tube 58 by means of the conduit 64, 76 and the inner tube 58 is connected with the outer envelope or tube 30 by means of the port 88.

Figure 5:
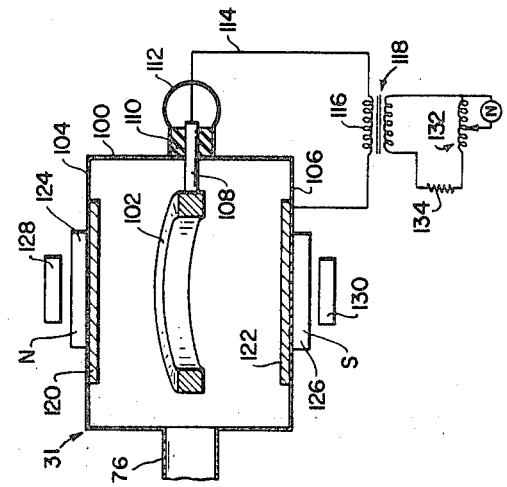

The ion pump 31, as best shown in FIGURE 5, comprises a cylindrical housing 100 having its side wall formed from a nonmagnetic metal and having end plates 104 and 106. The chamber within the housing is connected with the inner tube 58 and the outer tube 30 by means of the conduit 64, 76. A collector ring 102 is located within the housing and it is centrally disposed midway between the end plates 104 and 106. The ring 102 is of titanium metal and it is mounted in insulated relation to the housing 100 by a shank 108 fixed in a bushing insulator 110. A glass or ceramic insulating cap 112 extends from the bushing 110 and supports a high tension lead-in conductor 114 connected with the secondary winding 116 of a step-up transformer 118, said winding 116 being also connected with the housing 100. The primary winding of the transformer 118 is controlled by an autotransformer 132 and a current limiting resistor 134. It will be observed that the transformer winding 116 is connected between the titanium ring 102 and the end plates 104 and 106. Located with the housing 100 and attached respectively to the end plates 104 and 106 are disc-like electrodes 120 and 122, these electrodes being located in register with the ring 102. The electrodes are preferably formed of titanium or of other material such as zirconium, tantalum, etc., capable of absorbing substantial quantities of gas. Since the function of electrodes 120 and 122 is to absorb ions during the operation of the pump, the electrode material is degassed in a known manner prior to assembly of the pump. For the purpose of producing and directing a high coercive force magnetic field axially of the ring and the electrode assembly, two soft iron pole pieces 124 and 126 are provided which are located externally of the housing 100 and which are carried respectively by the end walls 104 and 106. The pole pieces 124 and 126 are in register respectively with the electrodes 120 and 122. A permanent magnet 127 (of FIGURE 1) is positioned to locate its opposite pole faces 128 and 130 thereof respectively adjacent the pole pieces 124 and 126 to complete the assembly.

The purpose of the pump 31 is to produce a high vacuum during the operation of the ion source, and as above stated, the interior of the pump and the interconnected ion source and accelerator tube are initially evacuated to a vacuum in the order of 0.001 to 0.0001 micron, this being effected through copper pinch-off 107. With the application of energizing potential from the transformer 118, a cold cathode electric discharge is established between the ring 102 and the electrodes 120 and 122. With the ring positive on the half cycle, five electrons within in the housing 100 are drawn to the ring, but the axial magnetic field supplied by magnet 127 of FIGURE 1 prevents the electrons from reaching the ring 102 by a linear path. The electrons are influenced by the magnetic field to follow spiral trajectories established thereby, thus greatly extending their paths and increasing the probabilities of ion producing collisions with gas molecules. Ions thus produced, being positive, are collected by the negatively charged electrodes 120 and 122, with those electrons not causing collisions and these resulting from such collisions being collected by ring 102. The transformer 118 has a sufficiently high output potential to cause ions thus accelerated toward the electrodes to be driven therein for removal from the housing 100. When the ring 102 is negative on the half cycle no gas discharge occurs. As will be apparent, a direct potential could be applied to ring 102 for continuous operation in the above manner.

While the principles of extending the electron paths above described are known, pumping speeds up to a factor of 10 over prior art pumps operating on those principles have been obtained by the use of titanium or a similar metal having "getting" characteristics as the ring material. During operation of the pump there is considerable sputtering action of the ring with a resultant increase on the pumping speed with the ring materials heretofore suggested and which do not "get." The use of a "getter" material for ring 102, permitting pumping speeds far beyond those previously believed possible in pumps of this type represents a very important advance in the art.

In addition to the primary pumping function of the pump 31, the pump is utilized in accordance with the invention to also serve as a vacuum pressure gage. The relation between the gas pressure (degree of vacuum) within housing 100 and the potential applied between ring 102 and electrodes 120, 122 is such that the pump current is a measure of vacuum. This feature eases processing of the vacuum tube. This current can be measured by inserting a current measuring meter (such as a milliammeter) in conductor 114 of FIGURE 5; the vacuum being related to this current in a direct logarithmic fashion.

Figure 7:
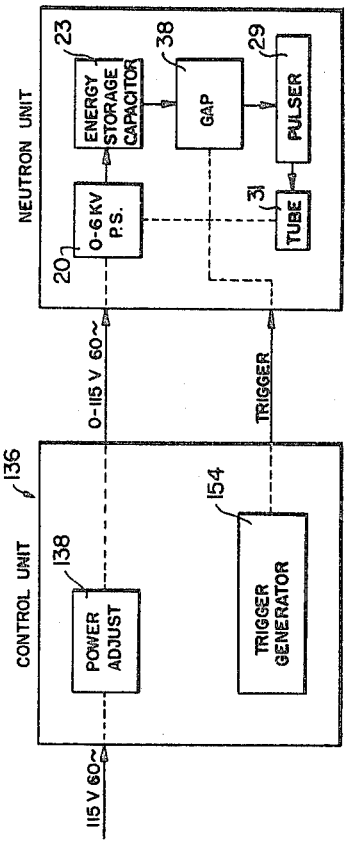

Referring to the circuits of FIGURES 6 and 7, operation of the device is as follows. With a source of alternating current from the control unit 136 and regulated by a power adjustment device 138 as shown, applied to transformer 20 through terminals at 116, a D.C. output is applied across the storage condenser 23 from the half wave rectifier network comprising diodes 104 and resistors 140 and 142, the condenser 23 being thus charged. The major components of the circuit employ a common ground return, and the nongrounded side of the condenser 23 is connected to one of the arcing electrodes 144 and 146 of the trigatron control tube 38. The other one of the arcing electrodes is connected with the secondary winding 150 of the pulsed output of transformer 32. The primary winding 152 of the pulse transformer 32 is pulsed from a remote trigger generator 154 in the control unit 136, the output of the generator 154 being connected to the transformer winding 152 through a terminal at 18 and a ground connection. The generator 154 is of a known type wherein the pulse rate may be varied at will. The transformer 32 has a very fast rise time to permit employment of pulse durations in the order of a few microseconds.

Since the primary winding 152 of the pulse transformer 32 is grounded and since the secondary winding 150 is connected to the arcing electrodes 144 and 146 of tube 38, the transformer serves to fire the tube 38 and to thereby connect the condenser 23 directly across the primary winding 80 of the target pulse transformer 29. The ungrounded end of the secondary winding 78 is connected by a conductor 156 with the terminal 70 on the disc target 68 and the target is thus pulsed. The firing of the tube 38 also serves to connect across the ion source stack 52 the surge current which results from discharge of the condenser 23 across the primary winding 80. An RC leg, with a resistor 161 and a condenser 162 in series, forms a parallel circuit with primary winding 80 across the condenser 23 with the tube 38 conductive. A bleeder resistor 164 shunts the condenser 162, with the value of resistor 164 selected to limit the source arcing potential to that required. The before mentioned conductor 99 is connected between the ungrounded end of dropping resistor 161 and the pulse load 98 to complete the voltage dividing circuit. C–162 may be 500 to 1500 mmf., R–161 15 to 100 ohms, and R–164 250 to 500 ohms. Since as above described, the stacked titanium discs 90 are series connected between grounded ends, an instantaneous arcing to ground across the discs results with attendant production of a localized deuterium ion plasma adjacent the arcing area of the stack. The rise time of the transformer 29 is selected to permit arcing of the ion source stack 52 slightly ahead of the peak pulsed output of said transformer to the target 68. The rise time of the output pulse from secondary winding 78 of the transformer 29 need be no more than a microsecond or less to insure proper acceleration of the space charge neutralized deuterium ions thus produced into the tritium loaded target 68 for the production of neutrons in a known manner.

If desired, the center tap of the secondary winding of the power transformer 20, FIGURE 6 may be connected by a conductor 170 and a series resistor 172 to the ion pump 31. The conductor 170 of FIGURE 6 is the same as, or alternative to, the conductor 114 of FIGURE 5 which connects to the ring 102 and whose function has been described. The connection 170 is operative on the positive half cycle to aid said pump in maintaining a proper vacuum within the glass and metal envelope 30.

*Neutron generator as shown in FIGS. 8 to 12*

FIGURES 8 to 10 show a construction which is to some extent alternative to the assembly 30 and the pump 31 as shown in FIGURES 1 to 7. However, it will be observed from the drawing and from the following description that the target is carried by the same tube that carries the ion source and not by a separate outer tube or envelope.

The structure of FIGURE 8 comprises generally an evacuated and continuously pumped tubular enclosure generically designated 180. Enclosure 180 includes a main glass cylinder 182 carrying a closure cap 184 at one end thereof and an annular member 186 at the opposite end with metal to glass seals, preferably of the Kovar type. The annular member 186 provides support for a concentrically positioned metal cylinder 188 which in turn provides support for an ion source 190 and a source shield 192. The source 190 is shown in enlarged detail in FIGURE 9, and it is below described. The closure cap 184 provides support for a tritium loaded titanium target 194 disposed at one end of a cylindrical target shield 196, bracket mounted at 198 for concentric alignment with the ion source 190 and the source shield 192. A conductor 200 is brought into the enclosure through the wall of a tubular neck 202 fitted with a glass insulator 304 and connected to a pulse source for firing the ion source. A cylindrical conduit 206 provides communication between the neck portion 202 and a vacuum pump 208, which in this instance is an ion pump shown in FIGURES 14 and 15, but which may be an ion pump as above described and shown in FIGURES 1 and 5. The interior of the ion source assembly is evacuated and sealed at the vacuum pinch-off 210 and said interior continuously maintained by the pump 208 under a high degree of vacuum during use.

The positive ion accelerator assembly 180, FIGURE 8, may be associated with other components for the production of high energy neutrons in the manner described above in respect to positive ion accelerator 30 of FIGURE 4. With the assembly 180 concentrically disposed within a target pulse transformer such as shown at 29, FIGURES 1 and 4, there is an ion discharge from the source 190 to the target 194.

The unit 190, as best shown in FIGURE 9, comprises a metal body 212 which encloses a stack of centrally apertured titanium deuteride washers 214 interleaved between centrally apertured mica insulators 216. The assembly is maintained concentrically of the housing 212 and is clamped between a metallic disc 219 and a centrally apertured metal disc 220. The disc 219 is supported by a ceramic washer 218 which is apertured to receive an electrode 222 integral with the disc 219. The central apertures in the disc 220 and in the washers 214 and in the insulators 216 provide an axial channel 224. The electrode 222 is pulsed from a suitable source connected to the conductor 200 so as to cause the washers 214 to arc over along the peripheries of their aligned central aperture at the axial channel 224.

The disc 220 provides an arcing pulse ground return through the shield 192 and the cylinder 188 and the cylinder supporting structure. A plasma of deuterium ions is thus established in the bore 224 as the deuterium gas occluded titanium discs are arced. Ions escape the bore 224 at the open left or lower end thereof and the ions are discharged onto the target 194. Without the hereinafter described grids, the ions would move along trajectory lines such as 226 shown in FIGURE 10, these lines passing through the electrical field shown at 228 in FIGURE 10. A lens effect, illustrated by the field lines 228, takes place as the ion paths diverge in a target direction until more than half through the electrical field flux pattern, and thereafter they converge toward the target. The ion trajectories as shown by lines 226 result in a focusing of ions at point 230 on the target, resulting in heat damage to this target.

As shown in FIGURE 8, a source grid 232 is provided near the open end of the source shield 192 to extend transversely of the shield axis. The grid is fixed to the shield 192 and thus maintained at the ground potential of the shield supporting structure. The cylindrical target shield 196 is provided at the open end thereof with a grid structure 234 which is fixed thereto to be maintained at target potential. The grid extends substantially over the entire projected area of the target.

The grounded source grid 232 controls ion trajectory divergency from the ion escape outlet of plasma source 224 to the plane of the grid. Thereafter the ion trajectory continues to diverge slightly until the trajectory lines are in parallelism with the axis of the target shield 196. The deuterium ions are thus drawn to the target 194 in response to the target pulse potential along parallel paths 229, FIGURE 11, which are evenly dispersed over the target area to insure evenly distributed neutron producing hits on the deuterium loaded target. The ions are thus completely defocused in their path between the ion source and the target by the field established by the grids 232 and 234.

Target shield 196 serves three functions. The first function is to provide support for the ion defocusing grid 234. The second function of the target shield is to protect the glass-to-metal seals at the ends of the tube 182 from high voltage fields which might result in glass puncture. The third function of the shield is to effect a reduction in the field at the target and to thus substantially reduce secondary electron current.

The circuit illustrated in FIGURE 12 operates in much the same manner as does the above described circuit of FIGURE 6. The condenser 243 is charged by the transformer 244 through rectifiers 245 and the resistor 247. A pulse introduced at 238 triggers transformer 240 to fire trigatron 242 and to connect a surge current resulting from discharge of condenser 243 through leads 246 and 248, and across primary 252 of target pulse transformer 254 and through the lead 200 to the ion source 190 to effect plasma producing arcing to ground. An arcing potential of 6000 volts is satisfactory for the source shown in FIGURE 9. The secondary winding 256 of target pulse transformer 234 is connected by a conductor 250 along with the target 194. Said winding 256 is so wound that it effects a resulting negative target pulse of about 150 kilovolts in response to each primary pulse in the primary winding 252. Conductor 260 may lead to the vacuum pump 208, being similar in function to the conductor 170 shown in FIGURE 6.

In the FIGURE 8 structure, both the source grid 232 and the target grid 234 are preferably 90% transmission grids, constructed of high melting temperature metal such as tungsten or molybdenum. The electric field established by the target pulse transformer 254 which incloses the structure of FIGURE 8 in the same manner as unit 30 is enclosed by transformer 29, FIGURE 4, may be modified by a single grid as shown in FIGURE 13 to insure proper defocusing of the target drawn ions. While the relation between an ion source 264, a source shield 266 and a source grid 268 is similar to comparable elements of the FIGURE 8 structure, a target shield 270 is provided which is of greater axial length than shield 196. With such a long target shield, it is not necessary to provide a target grid at the open end thereof. The structural design of the ion source and target assemblies dictates whether one or both grids are required to effect the desired result.

The ion pump 208 is shown only schematically in FIGURE 8 and it is shown in detail in FIGURES 14 and 15, comprising a rectangular housing 272 of nonmagnetic material such as stainless steel in which a titanium collector grid structure 274 is centrally disposed midway between spaced titanium side plates 276 and 278. The grid structure 274 consists of an opensided rectangular metallic box having two orthogonal partitions centrally fixed therein. The grid structure 274 centrally disposed between the end walls. The grid 274 further includes a centrally disposed longitudinal partition 286 connecting the end walls and the central partition. For a purpose to be stated, the end walls 280 and 282 and the partition 284 are provided with closely spaced perforations 289 distributed over their entire areas. The grid 274 is held in insulated relation to the housing 272 by a shank 288 fixed in a bushing insulator 290 of glass or ceramic material extending from the bushing support for a high tension lead-in conductor 292 connecting the high positive voltage power supply 294 between the housing 272. The conductor 292 may be regarded as an alternative to the conductor 260 shown in FIGURE 12. Since the function of electrodes 276 and 278 is to absorb ions during operation of the pump, the electrode material is degassed in a known manner prior to assembly of the pump. For the purpose of producing and directing a high coercive force magnetic field H axially of the grid structure and electrode assembly, a pair of soft iron pole pieces 296 and 298 are provided externally of the housing side walls and registered with the electrodes 276 and 278. A permanent magnet 300 is positioned to locate the opposite pole faces thereof adjacent the pole pieces 296 and 298 to complete the assembly. For simplicity of illustration, the magnet 300 and its pole pieces are omitted from FIGURE 8.

The purpose of pump 208 is to produce a high vacuum following an operation of the ion source and as above stated that interior of the pump and the interconnected ion source and accelerating tube are initially evacuated to a vacuum in the order of 0.001 to 0.0001 micron of mercury. With the application of energizing potential from power supply 294, the output of which may be controlled by an autotransformer 302 and a current limiting resistor 304, a cold cathode electric discharge is established between the grid structure 274 and the electrodes 276 and 278. With the grid structure 274 positive, free electrons within the housing 272 are drawn to the grid structure, but the axial magnetic field prevents them from reaching said grid structure by a linear path. The electrons are influenced by the magnetic field to follow spiral trajectories established thereby, thus greatly extending their path and increasing the probabilities of ion producing collisons with gas molecules. Ions thus produced, being positive, are collected by the negatively charged electrodes 276 and 278, with those electrons not causing collisions and those resulting from such collisions being collected by the grid structure 274. Power supply 294 has a sufficiently high output potential to cause ions thus accelerated toward the electrodes to be driven therein for removal from housing 272. In order that the pump 203 may maintain a vacuum not only in its own chamber but also within the envelope 180, ducts 306, 306 are provided in the member 188 and ducts 308, 308 are provided in the disc 220.

While the principles of extending the electron paths above described are known, pumping speeds, up to a factor 10 over prior art pumps operating on those principles, have been obtained by the use of titanium or a similar metal having "getting" characteristics as the grid material. During operation of the pump there is considerable sputtering action of the grid with a resultant increase on the pumping speed with the grid materials heretofore suggested and which do not "get." The use of a "getter" material for grid structure 274, permitting pumping speeds far beyond those previously believed possible in pumps of this type, represents a very important advance in the art. Further, the perforations 289 in the grid end walls and partition increase the pumping speed by increasing the ease of gas flow into the ion pump chamber. This represents an important advance in the art.

In addition to the primary pumping function of the device 208, the pump is utilized in accordance with the invention to also serve as a vacuum pressure gage. The relation between the gas pressure (degree of vacuum) within housing 272 and the potential applied between grid structure 274 and electrodes 276, 278 is such that the pump current is a measure of vacuum. This feature eases processing of the vacuum tube.

*Neutron generator as shown in FIGURES 16A to 20*

The neutron generator shown in FIGURES 16A to 20 is in many respects very similar to that shown in FIGURES 8 and 15, but it differs in various important details.

The generator is housed in an elongate cylinder 310, the cylinder being ordinarily between three and four feet in length and of a diameter, such as about four inches, to permit the unit to be lowered in the bore of an oil well or the like. The one end of the cylinder 310, the upper end during use, is capped by an insulating disc 314 held in place by a threaded metal ring 313. The disc 314 carries electric fixture 316 and 318 for connection to both an A.C. power source and to a remote source of pulsed actuating signals. The opposite end of the cylinder 310 is closed by a welded disc 317, the housing thus formed being hermetically sealed and it may be filled with oil or gas to protect the generator components from voltage breakdown.

Figure 16A:
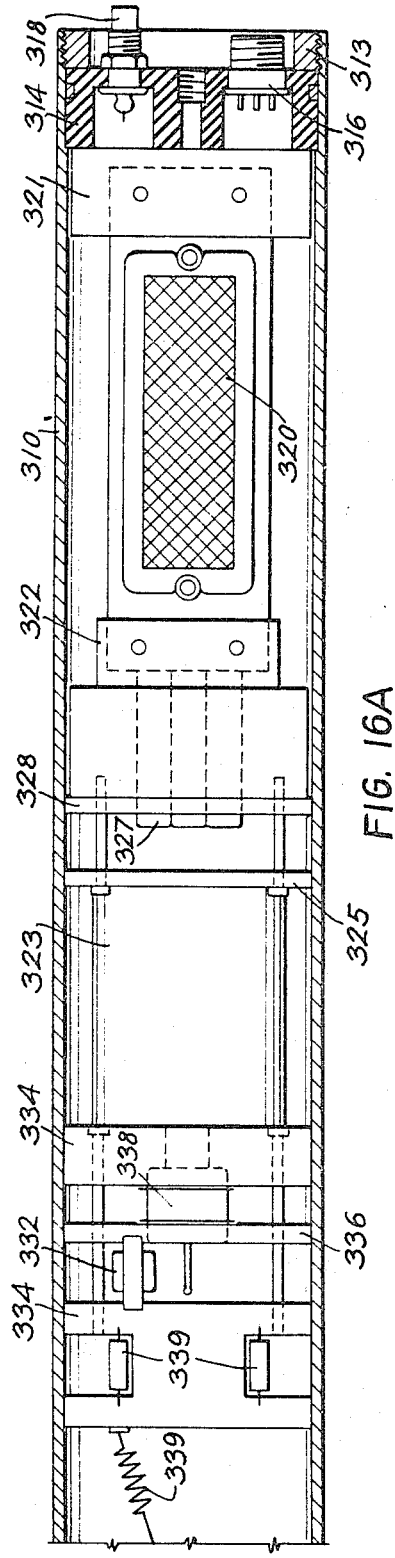
FIGURES 16A and 16B are respectively longitudinal sectional views of the front or lower portion and of the rear or upper portion of an alternative neutron generator embodying the invention.
Figure 16B:
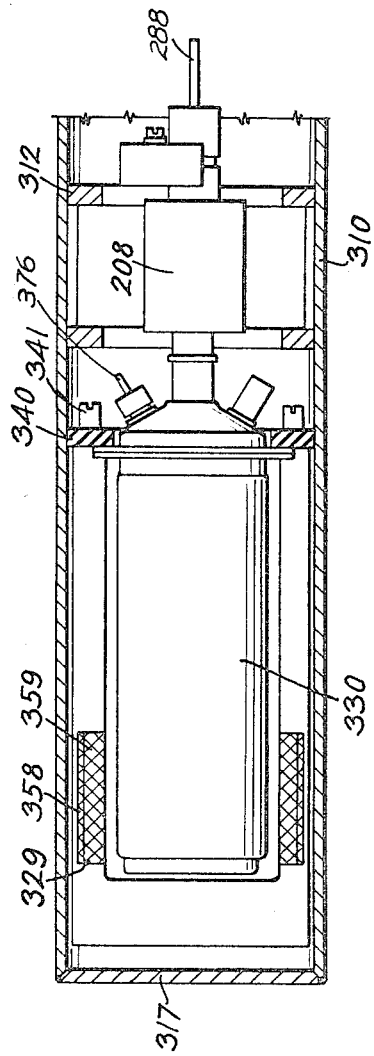

Basically, the components within the housing 310, as shown in FIGURES 16^A and 16^B, include an A.C. power transformer 320 mounted between partitions 321 and 322 of electrically insulating material, a condenser 323 of large capacity mounted between partitions 324 and 325, three diodes 327 in fixtures supported by a partition 328, a target pulse transformer 329, a positive ion accelerator neutron source tube 330, a small pulse transformer 332 mounted between partitions 334 and 336, and a trigatron tube 338 and other small components 339 in partition 334 and between partition 334 and 312 to complete the assembly, the wiring diagram of which is shown in FIGURE 18.

The glass and metal enclosure 330 above described is snugly received in the bore of the cylindrical target pulse transformer 329. The pulse transformer 329 is supported axially within the housing 310 by a suitable annular insulator 340. The transformer 329 is of the auto type with the windings encased in a cylindrical housing of epoxy resin cast under high pressure, for example at 3500 p.s.i., to obtain a rugged structure of high dielectric characteristics. Primary and secondary winding leads are brought out the right and through an insulating clamp bracket at the end of the transformer, one lead connection being shown at 341.

Referring to the circuit of FIGURES 17 and 18, operation of the device is as follows. With a source of alternating current from the control unit 342 and regulated by a power adjustment device 344 as shown, applied to transformer 320 through terminals 316, a D.C. output is applied across storage condenser 323 from the half wave rectifier network comprising diodes 342 and resistor 343, to charge condenser 323. The nongrounded side of condenser 323 is connected to the arcing electrode 344 of the trigatron control tube 338, electrode 345 is at ground potential until tube 338 is fired by the pulsed output of transformer 332, the secondary 346 of which is connected across the arcing electrodes 347 and 344 of the tube. The primary 337 of transformer 332 is pulsed from a remote trigger generator 335 in control unit 342, the generator output being connected to the transformer through terminal 318 and ground. The generator 335 is of a known type wherein the pulse rate may be varied at will.

When tube 338 is fired as controlled by pulse generator 335, electrode 345 of tube 338 is raised to the voltage which appeared on capacitor 323 and said capacitor 323 proceeds to discharge through the high voltage pulse transformer 329 and an ion source 356 which are connected in series. The ion source 356 comprises stacked titanium washers which are series connected between grounded ends. This ion source 356 is hereinafter described in detail, but it is generally similar to the ion source 190 shown in FIGURE 9. Instantaneous arcing effected across the washers results in an attendant production of a localized deuterium ion plasma adjacent the arcing area of the stack.

In order to cause the ion source 356 to arc, the capacitor 357 connected in parallel relation to primary 358 of pulse transformer 329, serves to momentarily short said primary so as to apply full capacitor voltage of the capacitor to the ion source 356. A bleeder resistor 365 shunts the condenser 357, with the value of the resistor selected to limit the source arcing potential to that required. After the ion source 356 arch to provide deuterium ions, as will be described below, the inductance 362, in parallel relation to ion source 356, provides a low impedance path for the discharge of the capacitor 323 through the primary 358 of the pulse transformer 329 so as to result in a high negative voltage on the secondary winding 359 of said pulse transformer. The secondary winding 359 is connected by a conductor 360 with the negative target electrode 361 in the ion accelerator tube 330. The transformer 329 is of the type wherein the primary and secondary windings are coextensive, the primary winding 358 surrounding the secondary winding 359.

Positive voltage from the capacitor 323 is connected through a resistor 363 to an electrode 364 of the ion pump 208 so as to cause vacuum pumping as will be described below.

Figure 19:
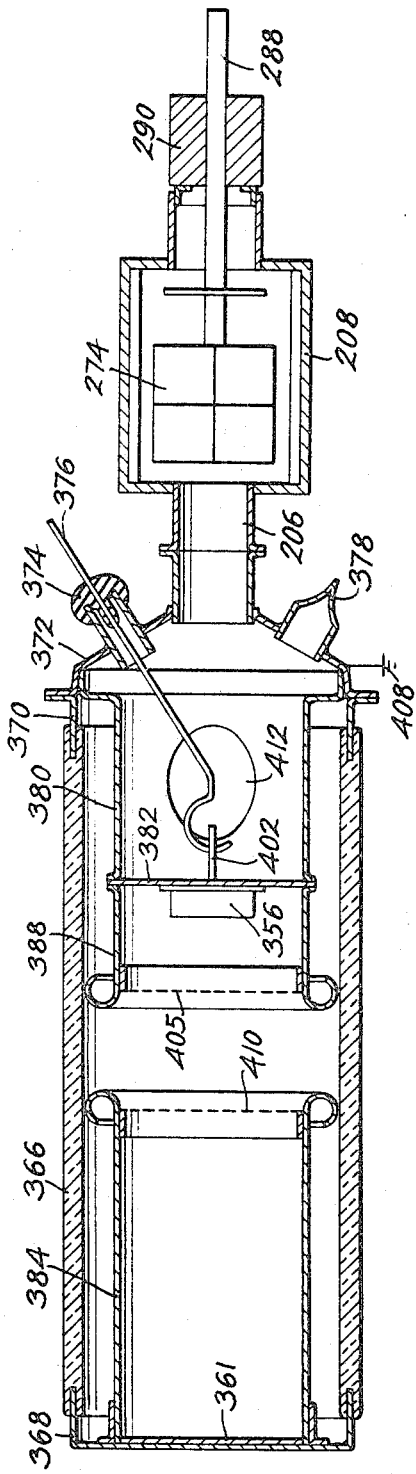
FIGURE 19 is a fragmentary view showing in longitudinal section the ion source and related parts shown in FIGURES 16A, 16B, 17 and 18.

The positive ion accelerator tube, generically referred to as 330, is shown in the cutaway detail in FIGURE 19. This tube includes a cylindrical glass insulator 366 the ends of which have bonded thereto, by glass to metal seals, metal sleevelike extensions 368 and 370. A metal cap 372 provides closure for the vacuum tube, the cap 372 being apertured to receive a lead-in insulator 374 for a conductor 376 connected to arc the ion source 356. The cap 372 has an inner flanged margin, as does the outer end of sleeve 370, with the flanges welded in unitary assembly to complete the end enclosure. A cylindrical connector 206, similar to that shown in FIGURE 8, provides communication between the cap 372 and a vacuum pump, which may be the same as the previously described pump 208. The interior of the ion source assembly is evacuated and sealed at vacuum pinch-off 378 and continuously maintained by the pump 208 under a high degree of vacuum during use.

A metallic inner cylinder 380 is supported on the cap 372 by vacuum brazing, ion source 356 being positioned by a ring 382 near the opposite end of cylinder 380. The free end of the inner cylinder 380 is provided with a polished and shaped margin piece 388 of large diameter aperture through which ions are drawn by target 361 from the source 356 as explained in detail below.

The target 361 is attached to end cup 368 in electrical contact therewith. The target consists of tritium or deuterium which has been occluded into titanium or zirconium which is in adhering relationship to a stainless steel backing plate which provides supporting strength for the thin layer of titanium material. A metal cylinder 384 is supported from the cup 368 by a ring to provide shaping of the electrical field in the vicinity of the edges of cup 368 and to prevent electrical arcing at these edges.

The ion source 356 produces a high density space charge neutralized deuterium ion cloud or plasma when an interleaved stack of titanium discs or washers having tritium gas occluded therein are peripherally or internally arced by electrical pulses sufficiently to drive out the occluded deuterium or tritium. While it is broadly known how to produce a plasma by arcing a stack of gas occluded discs, the present structure involves a novel and particularly effective disposition of the involved elements with confinement of the resulting plasma to a relatively small area from where it may rapidly be accelerated to target 361, which is of tritium loaded titanium, for the production of neutrons at a high output rate.

Figure 20:
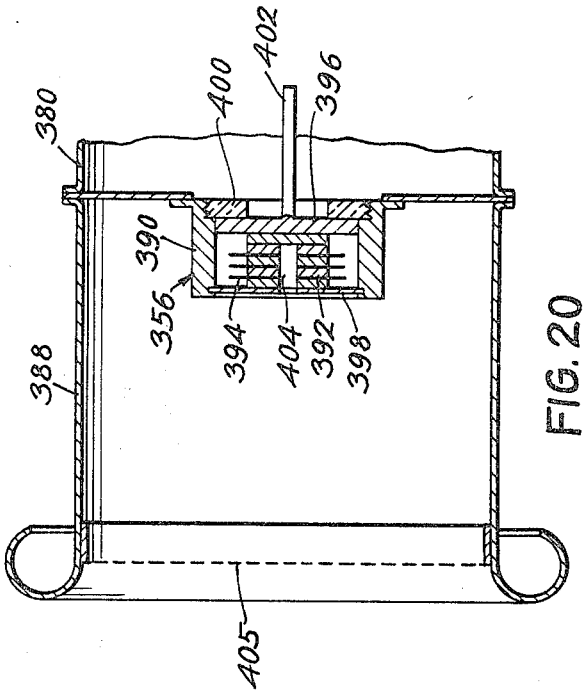
FIGURE 20 is an enlarged fragmentary sectional view of the ion source shown schematically in FIGURE 19.

The ion source 356, as best shown in FIGURE 20, comprises a metal body 390 which encloses a stack of centrally apertured titanium deuteride washers 392 interleaved between centrally apertured mica insulators 394. The assembly is maintained concentrically of the housing 390 and is clamped between a metallic disc 396 and a centrally apertured metal disc 398. The disc 396 is supported by a ceramic washer 400 which is apertured to receive an electrode 402 integral with the disc 396. The central apertures in the disc 398 and in the washers 392 and in the insulators 394 provide an axial channel 404. The electrode 402 is pulsed from a suitable source connected to the conductor 376 so as to cause the washers 392 to arc over along the peripheries of their aligned central aperture at the axial channel. The disc 398 provides an arcing pulse ground return through shield 388, cylinder 380, and the cylinder supporting structure. A plasma of deuterium ions is thus established in the channel or bore 404 as the tritium gas occluded titanium discs are arced.

The ions escape the bore 404 at the open end thereof. The simultaneous pulsing of target 361 results in the establishment of plural ion trajectories toward the target 361. As shown in FIGURE 19, a source grid 406 is provided near the open end of the source shield 388 to extend transversely of the shield axis. The grid is fixed to the shield 388 and it is thus maintained at the ground potential of the shield supporting structure as shown in 406. The cylindrical target shield 384 is provided at the open end thereof with a grid structure 410 which is fixed thereto to be maintained at target potential. The grid extends substantially over the entire projected area of this target. The effect of grids 406 and 410 is about the same as shown in FIGURE 11. The grounded source grid 406 permits ion trajectory divergency from the ion escape outlet of plasma source 404 to the plane of the grid 406. Thereafter the ion trajectory continues slightly to diverge until the trajectory lines are in parallelism with the axis of the target shield 384. The deuterium ions are thus drawn to the target in response to the target pulse potential along parallel paths which are evenly dispersed over the target arcs to insure evenly distributed neutron producing hits on the tritium loaded target. The ions are thus defocused in their path between the ion source and target by the field established by the grids.

The target shield 384 serves three functions. The first is to provide support for one of the ion defocusing grids. Secondly, the target shield protects the glass-to-metal seals from high voltage fields which might result in glass puncture. Thirdly, the resulting reduction in field size at the target substantially reduces secondary electron current.

As will be readily understood, the production of a plasma as above requires a surrounding vacuum, and since the arc expelled gases contaminate that vacuum, the glass and metal envelope which encloses the ion source must be pumped to maintain the desired degree of vacuum. The function of ion pump 208 is continuously to draw off the neutral gas which does not enter into the neutron producing reaction through target bombardment. The pump 208 is or may be the same in construction as that shown in FIGURES 8, 14 and 15, and previously described.

In order that the pump 208 may maintain a vacuum not only in its own chamber but also within source tube 330, a port 412 is provided in the side wall of the cylinder 380.

Figure 21:
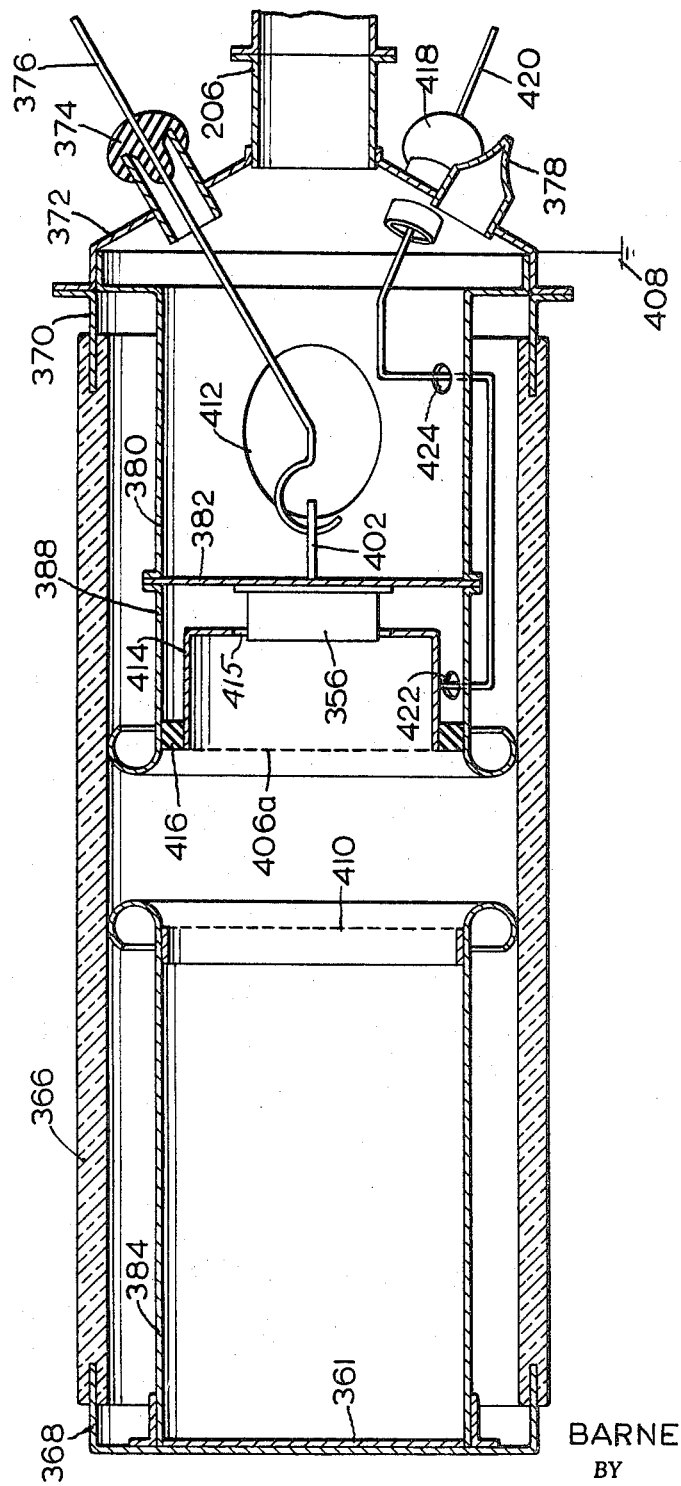
FIGURE 21 is a fragmentary view showing in longitudinal section a positive ion accelerator tube similar to that of FIGURE 19 including a modified source shield arrangement.

A modified positive ion generator tube 330 is shown in cut-away detail in FIGURE 21. This tube includes a cylindrical glass insulator 366, the ends of which have bonded thereto, by glass to metal seals, metal sleevelike extensions 368 and 370. A metal cap 372 provides closure for the vacuum tube, the cap 372 being apertured to receive a lead-in insulators 374 for a conductor 376 connected to arc the ion source 356 and a lead-in insulator 418 for a conductor connected to source shield 414. The cap 372 has an inner flanged margin, as does the outer end of sleeve 370, with the flanges welded in unitary assembly to complete the end closure. A cylindrical connector 206, similar to that shown in FIGURE 19, provides communication between the cap 372 and a vacuum pump which may be the same as the previously described pump 208. The interior of the ion source assembly is evacuated and sealed at vacuum pinch-off 378 and continuously maintained by the pump 208 under a high degree of vacuum during use.

A metallic cylinder 380 is supported on the cap 372 by vacuum brazing, ion source 356 being positioned by a ring 382 near the opposite end of cylinder 380. The free end of the cylinder 380 is provided with a polished and shaped margin piece 388 of larger diameter aperture through which ions are drawn by target 361 from the source 356 as explained below.

The target 361 is attached to end cup 368 in electrical contact therewith. The target consists of tritium or deuterium which has been occluded into titanium or zirconium which is in adhering relationship to a stainless steel backing plate which provides supporting strength for the thin layer of titanium material. A metal cylinder 384 is supported from the cup 368 by a ring to provide shaping of the electrical field in the vicinity of the edges of cup 368 and to prevent electrical arcing at these edges.

The ion source 356, which may be similar to that previously described or another suitable source, produces a high density space charge neutralized deuterium ion cloud or plasma when energized and the resulting plasma is preferably one confined to a relatively small area from where it may rapidly be accelerated to target 361, which is of tritium loaded titanium, for the production of neutrons at a high output rate.

The ion source 356 is connected to the conductor 376 by an electrode 402 which is pulsed from a suitable source to produce ions. The simultaneous pulsing of target 361 results in establishment of plural ion trajectories toward the target 361. As seen in FIGURE 21 a cylindrical source shield 414 is positioned concentrically within cylindrical member 388 to be substantially coextensive therewith. The source shield 414 is supported and electrically isolated from cylinder 388 by an insulator 416. The extremity of source shield 414 adjacent ion source may be terminated in a flange portion having the inner margin thereof spaced from the metal body 390 of the ion source. A source grid 406a is provided near the open end of the source shield 414 to extend transversely of the shield axis. The grid is fixed to the shield 414 and is thus maintained at the same potential as the source shield connected to conductor 420. cylindrical members 380 and 388 are provided with apertures 422 and 424 to pass conductor 420 from lead-in insulator 418 to source shield 414 in nonshorting relation since the ion source supporting structure is maintained at ground potential as shown at 408.

The cylindrical target shield 384 is provided at the open end thereof with a grid structure 410 which is fixed thereto to be maintained at target potential. The grid extends substantially over the entire projected area of this target. The effect of grid 410 is about the same as in FIGURES 11 and 19, however, since source grid 406a is electrically isolated from the ion source supporting structure a potential may be applied thereto to selectively provide a wider range of control over the ion trajectories in proceeding from the ion source 356 to the target 361. A suitable pulsed or D.C. source is connected to conductor 420 to cause a potential to be impressed on grid 406a which is positive with respect to the potential impressed on target 361 and negative with respect to the potential of the ion source supporting structure at ground potential. A suitable range of source grid potential for the embodiment shown has been found to be on the order of from about 50 volts to about 15 kilovolts negative. The particular potential applied to source grid 406a permits controlled ion trajectory divergency from the ion source to the plane of grid 406a as well as modifying and controlling the trajectories to a degree beyond to produce ion trajectory lines of the desired configuration on striking target 361. The deuterium ions are thus drawn to the target in response to the target pulse potential along parallel paths which may be selectively controlled to be evenly dispersed over the target area to insure evenly distributed neutron producing hits on the tritium loaded target. The ions are selectively defocused in their path between the ion source and target by the field established by the target grid and the selectively variable field established by the source grid. Being able to control the potential impressed on the source grid provides novel means for compensating for minor mechanical and electrical variations from one generator tube to another as well as to permit the obtaining of desired optimum ion paths for a particular set of conditions coupled with maximum efficiency and long tube life. The potential impressed on source grid 406a may be derived from the source supplying the target 361 or may be obtained from an independent source adapted to provide a potential of suitable magnitude and polarity.

The target shield 384 serves three functions. The first is to provide support for one of the ion defocusing grids. Secondly, the target shield protects the glass-to-metal seals from high voltage fields which might result in glass puncture. Thirdly, the resulting reduction in field size at the target substantially reduces secondary electron current.

As will be understood, the production of a plasma as above, requires a surrounding vacuum, and since the arc expelled gases contaminate that vacuum, the glass and metal envelope which encloses the ion source must be pumped to maintain the desired degree of vacuum. The function of ion pump 208 is continuously to draw off the neutral gas which does not enter into the neutron producing reaction through target bombardment. The pump 208 is, or may be, the same in construction as that shown in FIGURES 8, 14 and 15 and previously described.

In order that the pump 208 may maintain a vacuum not only in its own chamber but also within the source tube 330, a port 412 is provided in the side wall of the cylinder 380.

While there have been described what at present are considered to be the preferred embodiments of the invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A generator of radioactive radiation comprising an ion source, a target spaced from said source and including a substance adapted to react with impinging ions to produce radioactive radiation, means for projecting ions from said source to said target, a control grid means electrically isolated from and selectively maintained at other than the ion source potential disposed between said source and target for confining ion travel therebetween to optimum linear paths, means for enclosing said source, target, and control grid means in a container and means for continuously evacuating and maintaining said container under a high degree of vacuum.

2. The device of claim 1, which includes a further control grid means disposed between said first mentioned grid means and said target and maintained essentially at target potential.

3. In a device of the character described, an elongated housing of electrically insulating material, a pulse transformer encircling said housing, a pair of electrical shields disposed within said housing, said shields having outer closed ends and spaced inner open ends in substantial alignment axially of said housing, a target positioned at the closed end of one of said shields and including a substance adapted to react with impinging ions to produce radioactive radiation, an ion source positioned within the other shield, means for pulsing said ion source to produce a plasma of positive ions suitable for said radiation producing target impingement, means cooperatively associated with said pulse transformer and said target for pulsing said target at a negative potential sufficient to accelerate ions from said source and effect impingement thereof on said target, control grid means associated with the ion source shield adjacent the inner open end thereof electrically isolated therefrom and adapted to be selectively maintained at other than the ion source potential to confine the path of ion travel from said source to said target along optimum linear paths and means for applying such potential to said control grid means.

4. The device of claim 3 wherein said control grid is maintained at a potential within the range of from greater than zero volts negative to about 15 kilovolts negative with respect to the ion source.

5. The device of claim 3 which further includes control grid means supported by said target enclosing shield to extend across the open end thereof to be at equipotential with said target and shield.

6. A pulsed neutron source comprising an evacuated envelope containing ion source means for the production of positive ions in response to an electrical pulse, means for periodically pulsing said source, an electrically conductive target within said envelope spaced from said source, said electrically conductive target comprised, at least in part, of a material which will emit neutrons under positive ion bombardment, means for pulsing said target with a negative potential, grid control means intermediate and electrically isolated from said source and target ion source shield means electrically connected to said grid control means, means for maintaining said grid control means at a potential positive with respect to the target potential and negative with respect to the ion source potential to direct target bombarding ions along optimum linear paths between said source and said target and means for continuously evacuating said envelope.

7. The device of claim 6 wherein said means for maintaining said grid control means at a potential positive with respect to the target comprises means for applying to said control grid means a potential which is positive with respect to the target and near the ion source potential.

8. The device of claim 6 wherein said control grid is maintained at a potential within the range of from greater than zero volts negative to about 15 kilovolts negative with respect to the ion source.

9. The device of claim 6 wherein said control grid means is disposed between said ion source and said target to be adjacent said ion source and across the ion path and a second control grid means disposed between the first mentioned grid means and said target with the second grid means being electrically connected to said target.

References Cited

UNITED STATES PATENTS

| | | | |
|---|---|---|---|
| 2,689,918 | 9/1954 | Youmans | 250—83.6 |
| 2,712,081 | 6/1955 | Fearon | 313—61 |
| 2,764,707 | 9/1956 | Crawford et al. | 313—63 |
| 2,806,161 | 9/1957 | Foster | 313—63 |
| 2,906,903 | 9/1959 | Graves | 313—61 |
| 2,914,677 | 11/1959 | Arnold | 250—84 |
| 2,926,271 | 2/1960 | Brinkerhoff | 313—61 |
| 3,141,975 | 7/1964 | Carr | 250—84.5 |

ARCHIE R. BORCHELT, *Primary Examiner.*